United States Patent
Hurst et al.

(10) Patent No.: US 10,471,806 B2
(45) Date of Patent: Nov. 12, 2019

(54) DC ELECTRIC COMPRESSOR-DRIVEN AIR CONDITIONING SYSTEM

(71) Applicant: Curtis Industries, LLC, Worcester, MA (US)

(72) Inventors: Deven Hurst, Riverview, FL (US); Gabor Hajos, Holden, MA (US)

(73) Assignee: Curtis Industries, LLC, West Boylston, MA (US)

( * ) Notice: Subject to any disclaimer, the term of this patent is extended or adjusted under 35 U.S.C. 154(b) by 85 days.

(21) Appl. No.: 15/698,105

(22) Filed: Sep. 7, 2017

(65) Prior Publication Data
US 2018/0065450 A1 Mar. 8, 2018

Related U.S. Application Data

(60) Provisional application No. 62/384,613, filed on Sep. 7, 2016.

(51) Int. Cl.
*B60H 1/32* (2006.01)
*B60H 1/00* (2006.01)

(52) U.S. Cl.
CPC ....... *B60H 1/3208* (2013.01); *B60H 1/00364* (2013.01); *B60H 1/00428* (2013.01); *B60H 1/00764* (2013.01); *B60H 1/00878* (2013.01); *B60H 1/3222* (2013.01); *Y02T 10/88* (2013.01)

(58) Field of Classification Search
CPC ............ B60H 1/00421; B60H 1/00428; B60H 1/00764; B60H 1/00878; B60H 1/3208; B60H 1/3222; Y02T 10/88
See application file for complete search history.

(56) References Cited

U.S. PATENT DOCUMENTS

| | | | | |
|---|---|---|---|---|
| 3,668,419 | A | * | 6/1972 | Cherry ............... B60H 1/00428 219/202 |
| 5,637,986 | A | * | 6/1997 | Kanazawa ............. H02J 7/245 322/20 |
| 5,957,663 | A | * | 9/1999 | Van Houten ....... B60H 1/00828 123/41.12 |
| 2001/0010261 | A1 | * | 8/2001 | Oomura ............... B60H 1/3208 165/42 |
| 2004/0178636 | A1 | * | 9/2004 | Iwanami .............. B60H 1/3222 290/40 C |
| 2006/0047398 | A1 | * | 3/2006 | Abe ..................... B60H 1/3222 701/69 |

(Continued)

*Primary Examiner* — Marc E Norman
(74) *Attorney, Agent, or Firm* — Fish & Richardson P.C.

(57) ABSTRACT

The subject matter of this specification can be embodied in, among other things, a climate control system includes a power delivery system configured to be driven by a motor of a vehicle and having a first power output that selectively provides power based on a control signal and a second power output that provides power to the vehicle, an air conditioner configured to be at least partly powered by the first electrical output and having a compressor configured to compress a refrigerant, an evaporator configured to expand the refrigerant, a first blower configured to direct air across the evaporator, and a second blower configured to direct air across a heat exchanger, and a load management controller configured to operate the air conditioner and the first control signal based on an operator parameter and one or more vehicle parameters.

18 Claims, 11 Drawing Sheets

(56) References Cited

U.S. PATENT DOCUMENTS

2006/0151164 A1\* 7/2006 Zeigler .............. B60H 1/00378
165/240
2011/0000244 A1\* 1/2011 Reason .............. B60H 1/00428
62/323.3

\* cited by examiner

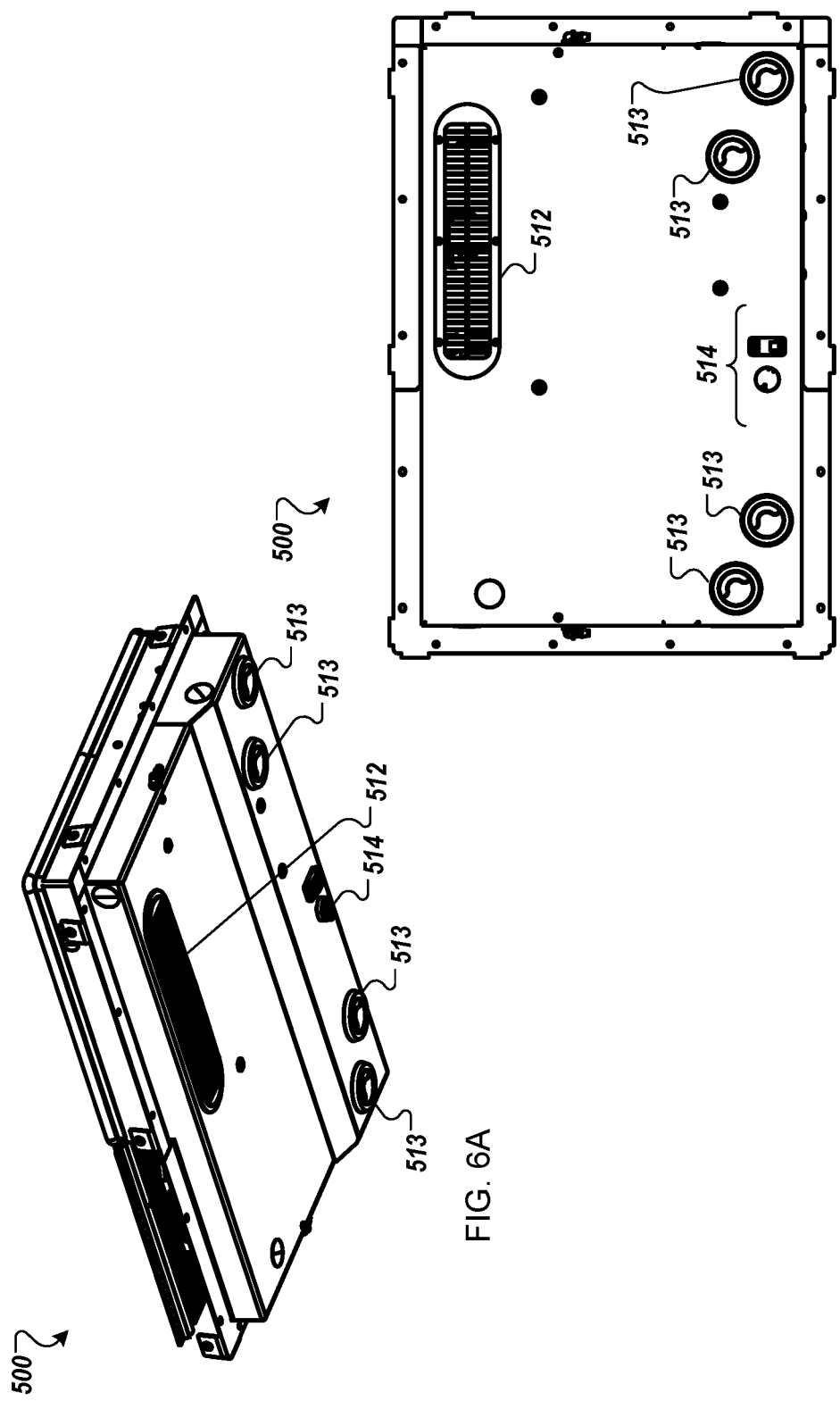

DC ELECTRIC COMPRESSOR-DRIVEN AIR CONDITIONING SYSTEM

TECHNICAL FIELD

This instant specification relates to vehicular air conditioning systems.

BACKGROUND

Air conditioning (AC) systems are used in many passenger and commercial vehicle applications. These systems typically include a compressor unit that is mechanically driven by the vehicle's motor, for example, by using a belt to transmit rotary motion of the crankshaft in order to spin the compressor. In such applications, the motor and the compressor are designed to work with each other. For example, sufficient space is provided for the compressor and drive belt within the engine compartment, and the motor is designed to provide ample horsepower to drive the compressor while also propelling the vehicle.

Electrical air conditioning systems are also used in some vehicular applications. In some examples, the compressors are driven by alternating current power, e.g., a 120 v rooftop AC unit driven by an onboard generator of a motor home. In some examples, the motor, compressors and power components are designed to work with each other. For example, some vehicles come from the factory equipped with an alternator or generator that is sized to power the compressor, and the motor is designed to provide ample horsepower to drive the alternator or generator with enough energy to power the compressor while also propelling the vehicle.

SUMMARY

In general, this document air conditioning systems for vehicles.

In a first aspect, a climate control system includes a power delivery system configured to be driven by a motor of a vehicle and having a first power output that selectively provides power based on a control signal and a second power output that provides power to the vehicle, an air conditioner configured to be at least partly powered by the first electrical output and having a compressor configured to compress a refrigerant, an evaporator configured to expand the refrigerant, a first blower configured to direct air across the evaporator, and a second blower configured to direct air across a heat exchanger, and a load management controller configured to operate the air conditioner and the first control signal based on an operator parameter and one or more vehicle parameters.

Various embodiments can include some, all, or none of the following features. The operator parameter can be an operator-provided parameter having one or more of a heating mode parameter, a cooling mode parameter, a blower mode parameter, or a vehicle performance parameter. The one or more vehicle parameters can be one or more of an engine operational parameter, an electrical system parameter, or an environmental parameter. The engine operational parameter can be one or more of a measured engine speed value, a measured engine torque value, a measured manifold pressure value, a measured vehicle speed value, or a measured throttle position value. The electrical system parameter can be one or more of a power switch setting, a measured battery current value, or a measured battery voltage value. The environmental parameter can be one or more of a timer parameter, a measured vehicle cabin air temperature value, a measured ambient air temperature value, or a measured evaporator core temperature value. The control signal can be a clutch control signal, the power delivery system can be a mechanical power delivery system, and the first power output can be configured to mechanically drive the compressor through a clutch that is configured to selectively engage based on the clutch control signal. The compressor can have an electric motor, the control signal can be a first alternator field current, the power delivery system can be an electrical power delivery system, and the first power output can be a first electrical output of a first alternator that selectively provides electrical power to the electric motor based on the alternator field current. The alternator system can include the first alternator, and a second alternator configured to provide the second power output as a second electrical output based on a second field current. The first alternator can be configured to spin at a different speed than the second alternator. The load management controller can be configured to operate the air conditioner by controlling one or more of the first blower, the second blower, and the compressor.

In another aspect, a method of controlling a climate control system includes receiving, from an operator, an operator parameter, measuring a vehicle parameter of a vehicle, operating, based on the operator parameter and the vehicle parameter, a first power output of a power delivery system configured to be driven by a motor of a vehicle, and operating an air conditioner, powered at least partly by the first power output, based on an operator parameter and the vehicle parameter.

Various implementations can include some, all, or none of the following features. The air conditioner can include a compressor configured to compress a refrigerant, an evaporator configured to expand the refrigerant, a first blower configured to direct air across the evaporator, and a second blower configured to direct air across a heat exchanger. The operator parameter can be one or more of an operator-provided parameter having one or more of a heating mode parameter, a cooling mode parameter, a blower mode parameter, or a vehicle performance parameter. The vehicle parameter can be one or more of an engine operational parameter, an electrical system parameter, or an environmental parameter. The engine operational parameter can be one or more of a measured engine speed value, a measured vehicle speed value, a measured engine torque value, a measured manifold pressure value, or a measured throttle position value. The electrical system parameter can be one or more of a power switch setting, a measured battery current value, a measured battery voltage value, or a battery voltage threshold value. The environmental parameter can be one or more of a timer parameter, a measure vehicle cabin air temperature value, a measured ambient air temperature value, or a measured evaporator core temperature value. Operating the first electrical power output of the power delivery system can include selectively providing a clutch control signal, wherein the power delivery system is a mechanical power delivery system configured to be driven by a motor of a vehicle, and the first power output is configured to mechanically drive a compressor of the air conditioner through a clutch that is configured to selectively engage based on the clutch control signal. Operating the first electrical power output of the power delivery system can include selectively providing a first field current, wherein the power delivery system is an alternator system having a first alternator configured to be driven by a motor of a vehicle, wherein the first power output is a first electrical output of the first alternator, the first electrical output configured to power, based on the first field current, to an electric motor configured to drive a compressor of the air conditioner. The alternator system can include the first alternator and a second alternator configured to provide the second power output as a second electrical output based on a second field current. The first alternator can be configured to spin at a different speed than the second alternator. Operating the air conditioner includes controlling one or more of the first blower, the second blower, or the compressor.

In another aspect, a non-transitory computer storage medium is encoded with a computer program, the program including instructions that when executed by data processing apparatus cause the data processing apparatus to perform operations including receiving, from an operator, an operator parameter, measuring a vehicle parameter of a vehicle, operating, based on the operator parameter and the vehicle parameter, a first power output of a power delivery system configured to be driven by a motor of a vehicle, and operating an air conditioner, powered by the first power output, based on an operator parameter and the vehicle parameter.

The systems and techniques described here may provide one or more of the following advantages. First, a system can provide air conditioning or other climate control for vehicles that are not necessarily designed for, or come equipped with, air conditioning systems. Second, the system can retrofit vehicles to have air conditioning or other climate control. Third, the system has a low-profile design that does not significantly increase the overall dimensions of a vehicle after installation.

The details of one or more implementations are set forth in the accompanying drawings and the description below. Other features and advantages will be apparent from the description and drawings, and from the claims.

DESCRIPTION OF DRAWINGS

FIGS. 6A and 6B show an example cabin vent.

DETAILED DESCRIPTION

This document describes systems and techniques for providing air conditioning (AC) or other climate control capabilities to vehicles. In particular, the systems and techniques can be used to retrofit vehicles that do not typically come from the factory with AC systems, and/or vehicles with motors that are powerful enough to drive typical AC systems without seriously affecting vehicle performance. Examples of such vehicles can include recreational vehicles (e.g., side-by-side four-wheelers with cabs), enclosed golf carts, tractors with cabs, construction equipment with enclosed cabs, and other types of generally smaller vehicles that have enclosed passenger compartments.

Figure 1:
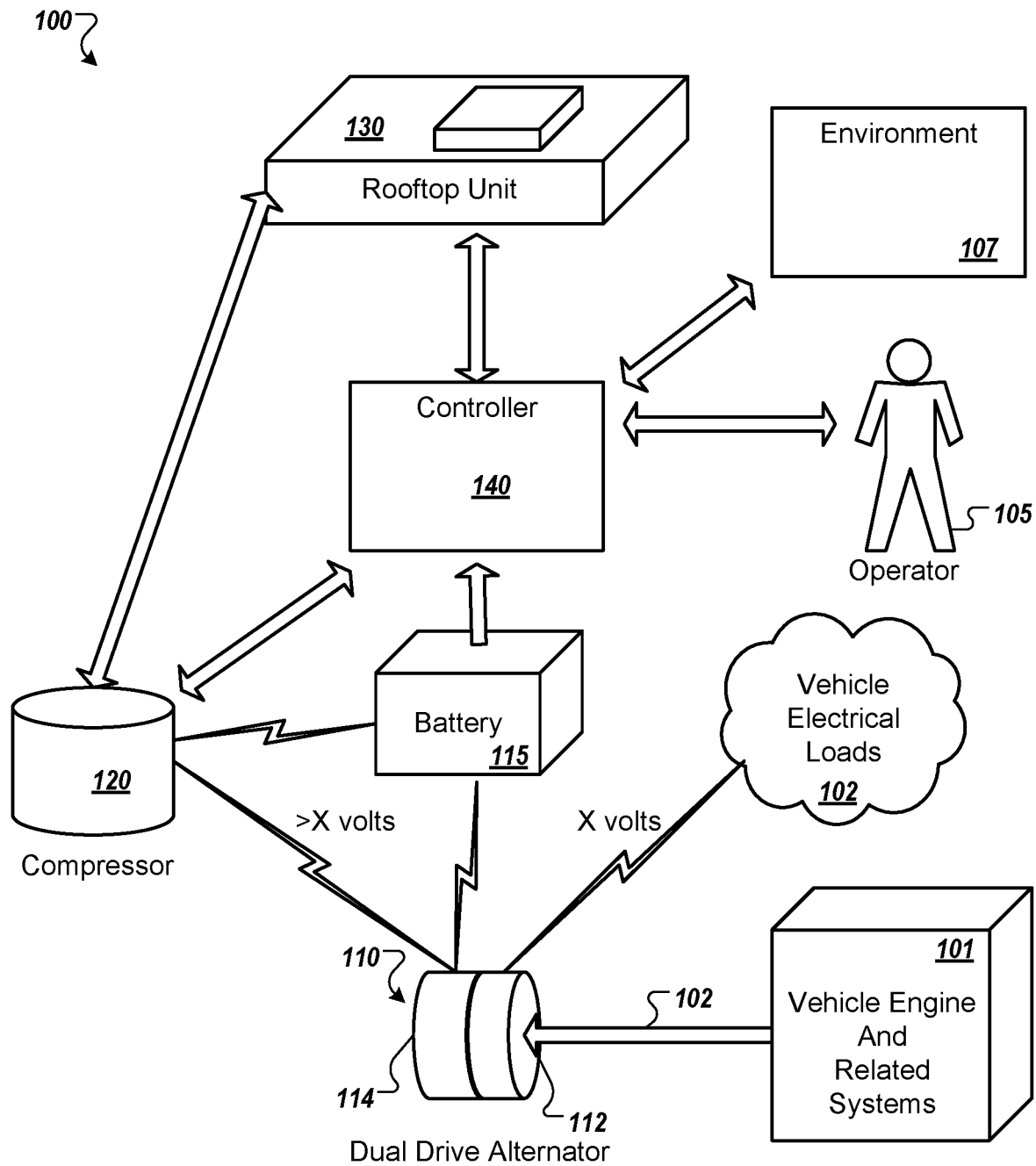
FIG. 1 is a schematic diagram that shows an example air conditioning system for a vehicle.

FIG. 1 is a schematic diagram that shows an example air conditioning system 100 for a vehicle. Examples of such vehicles include recreational vehicles (e.g., side-by-side four-wheelers with cabs), enclosed golf carts, tractors with cabs, construction equipment with enclosed cabs, and other types of generally smaller vehicles that have enclosed passenger compartments.

A dual-drive alternator system 110 draws power from a vehicle motor 101 (e.g., a gas, diesel, or liquid propane powered internal combustion engine) via an output shaft 102 (e.g., crankshaft, drive shaft, power take off shaft). The dual-drive alternator system 110 is configured to provide two electrical outputs based on mechanical power provided by the motor 101. A first output section 112 provides power to drive a vehicle's electrical system, e.g., 12 v to power stock vehicle electrical loads such as lights, instruments, ignition, battery charging, engine controllers, and radio. In some embodiments, the first output section 112 can replace the power that is normally provided by a stock (e.g., O.E.M.) alternator and supply power to both the OEM systems and the air conditioner system.

A second output section 114 (e.g., a secondary, overdriven alternator) provides power to drive an electro-mechanical compressor 120. The compressor 120 includes an electric motor (not shown) that uses electrical energy provided by the second output section to compress a refrigerant that is provided to a rooftop unit 130. The rooftop unit expands the refrigerant in a process that cools air that is then provided to a vehicle compartment (e.g., cab) or other space.

In some embodiments, the second output section 114 can provide power that is electrically isolated from the power provided by the first output section 112. In some embodiments, the power provided by the second output section 114 can be at a different power level than what is provided by the first output section 112. For example, the first output section 112 can provide the typical 12 v DC power used by many vehicles, while the second output section can provide a higher voltage (e.g., 24 v, 36 v, 48 v) to the compressor 120.

In some embodiments, the dual-drive alternator system 110 can provide a simplified installation process and can be applicable to many vehicles. For example, the dual-drive alternator system 110 can be designed such that the first output section 112 and the second output section 114 fit within the same space and with the same arrangement of mounting points as a vehicle's stock, single-output alternator. As such, the dual-drive alternator system 110 can be used as a replacement for a stock or OEM alternator with little or no modification to the alternator 110 or the vehicle motor 101.

In some embodiments, the dual-drive alternator system 110 can be a second alternator that is driven in addition to the primary (e.g., OEM) alternator. In some embodiments, the second alternator can be driven at a slower or higher speed than the OEM alternator. For example, a secondary alternator can be spun at least 30% faster than the OEM alternator to provide additional power at low engine speeds. In some embodiments, the dual-drive alternator system 110 can include two separate alternators driven in sequence or in parallel relative to each other.

In some embodiments, the dual-drive alternator 110 can provide isolation from OEM power circuit. In some implementations, the dual-drive alternator 110 can provide voltages up to 48 v or higher, for example to provide more power to the compressor 120 at lower RPMs. In some implementations, the dual-drive alternator 110 can provided using relatively lower cost components. In some implementations, the dual-drive alternator 110 can provide a pathway for other electrical accessories such as heaters, consoles, or other electrical loads.

In some embodiments, the dual-drive alternator 110 can provide power for typical (e.g., OEM) vehicle operations under predetermined vehicle performance conditions (e.g., high engine power use) with the first output section 112, and engage the second output section 114 under other predetermined conditions (e.g., when excess power is available from the engine).

As mentioned above, the electro-mechanical compressor 120 uses electrical power provided by the alternator 110 to compress a refrigerant that is provided to the rooftop unit 130. In some embodiments, the electro-mechanical compressor 120 can include an electrical motor that is directly coupled to a rotary compressor. As such, the electro-mechanical compressor 120 can eliminate the need to mechanically drive the compressor directly from the vehicle motor 101. In some embodiments, use of the electro-mechanical compressor 120 can simplify the installation process and can greatly expand universality and vehicle applicability. In some embodiments, the electro-mechanical compressor 120 can enable and integrated unit concept. In some embodiments, use of the electro-mechanical compressor 120 can make it easier to monitor and control the load created by the system 100 on the vehicle motor 101.

The rooftop unit 130 expands refrigerant that was previously compressed by the electro-mechanical compressor 120 to cool air that is then provided to a vehicle cab or other space. In some embodiments, the rooftop unit 130 is an integrated rooftop unit. For example, the compressor 120, heat exchanger cores, fans, and/or controls can all be housed within one compact enclosure. In some embodiments, the rooftop unit 130 can be pre-assembled into a roof of a cab with pre-charged refrigerant. In some embodiments, the rooftop unit 130 can be fast and simple to install, for example, requiring only wiring to the alternator 110 and mounting upon the vehicle.

Operation of the system 100 is coordinated by a load management controller 140. The load management controller 140 provides a software based "black-box" approach to monitor vehicle parameters (e.g., horsepower (HP), torque, RPMs of the engine 101, vehicle speed, voltage levels, current levels), environmental parameters in the surrounding environment 107 (e.g., time, cabin temperature, ambient temperature), and/or peak shave loads presented to the vehicle motor 101 by the compressor 120. For example, the load management controller 140 may determine that the vehicle motor 101 is operating at less than full engine load (e.g., idling, cruising) and has enough excess power in reserve to perform at the current level of demand while also handling the load of the alternator 110 caused by the compressor 120. In such examples, the load management controller 140 may activate the air conditioner and/or compressor 120 or allow it to be activated. In other situations, the load management controller 140 may determine that the vehicle motor 101 is operating under a greater engine load (e.g., accelerating, towing, going uphill, hauling a heavier load) and lacks sufficient power to perform at the current level of demand while also handling the load of the alternator 110 caused by the compressor 120. In such examples, the load management controller 140 may temporarily or momentarily deactivate the compressor 120 or prevent it from being activated. In some implementations, the load management controller 140 may allow the compressor 120 to continue to run using power from a vehicle battery 115 while removing the alternator load from the vehicle motor 101 (e.g., by deactivating a field current to the secondary alternator).

In some implementations, peak shaving can be based on an operator setting provided by an operator 105. For example, the system 100 may include a user control that the operator 105 (e.g., a driver) can manipulate to set a balance between how power from the vehicle motor 101 is divided or diverted between vehicle performance (e.g., acceleration, torque, speed) and user comfort (e.g., air conditioning, heating). For example, the user may favor power over comfort by setting a threshold that causes the load management controller 140 to cut the compressor 120 early (e.g., anything above idling power) at the expense of comfort to ensure a greater amount of engine power is available for vehicle operations. In another example, the user may favor comfort over power by setting a threshold that causes the load management controller 140 to cut the compressor 120 under only the heaviest of vehicle performance demands (e.g., wide open throttle, heavy acceleration, high torque, high speed) to ensure that the air conditioner system 100 continues to run. In some implementations, the load management controller 140 may limit engine performance based on the user setting. For example, acceleration rates or the top speed of the vehicle may be limited to ensure that the vehicle motor 101 has enough power in reserve enough of the time to maintain a user-selected level of comfort.

In some embodiments, the output sections 112 and 114 of the dual-drive alternator 110 can be used to power separate components of the system 100. For example, the output section 112 can power cabin blowers in the rooftop unit 130 (e.g., to provide air circulation most of the time) while the output section 114 can power the compressor (e.g., to provide refrigeration when the engine 101 has enough power to spare). In some embodiments, the first output section 112 and the second output section 114 may be kept substantially electrically isolated (e.g., powering separate components of the system 100). In some embodiments, the first output section 112 and the second output section 114 can be configured to work cooperatively. For example, the first output section 112 can be configured to perform OEM functions such as battery charging substantially all of the time when the engine 101 is running, and the second output section 114 can be configured to provide additional charging when the engine 101 can produce more power than is currently needed for OEM vehicle operations.

Figure 2:
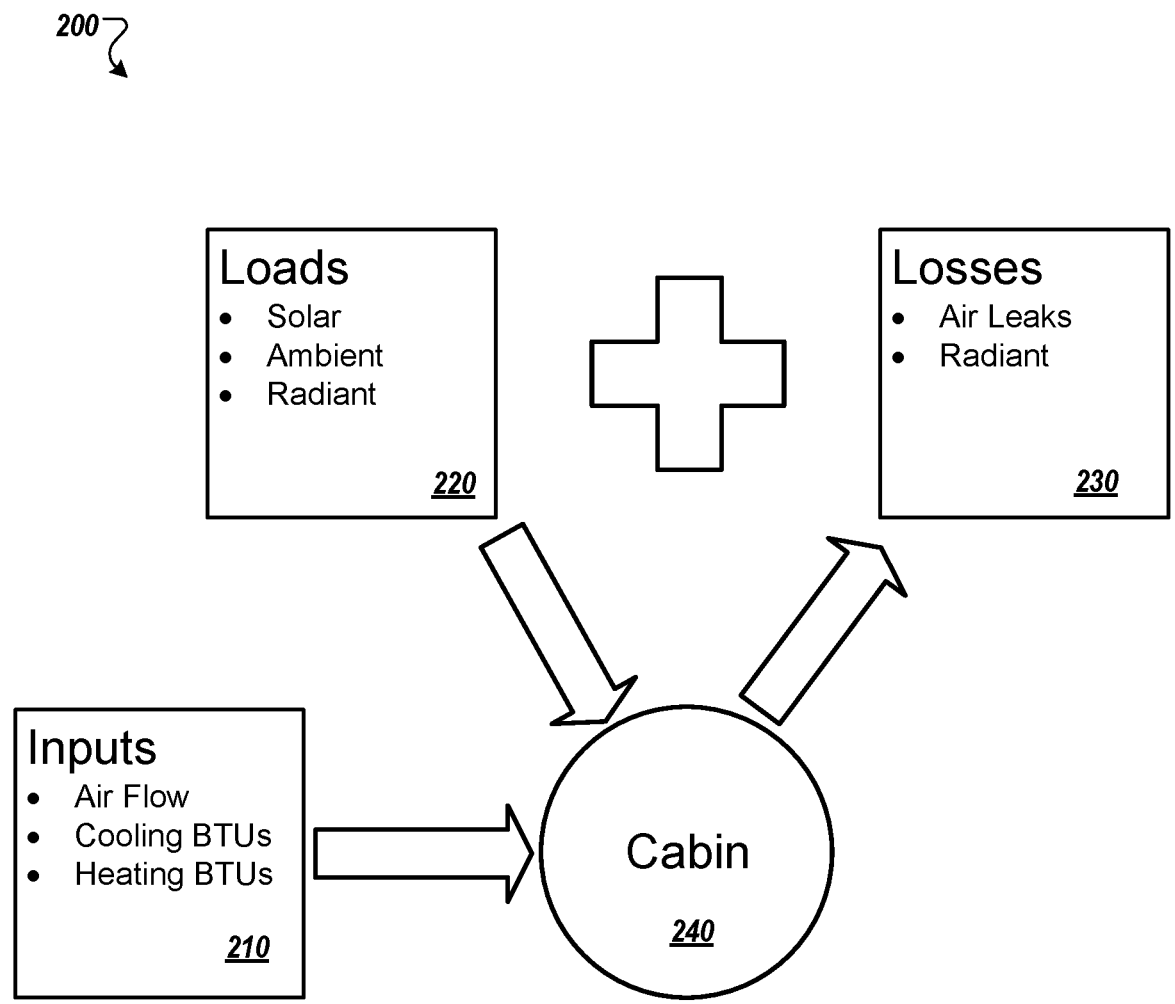
FIG. 2 is a block diagram that shows example inputs and outputs for an air conditioning system.

FIG. 2 is a block diagram 200 that shows example inputs 210, 220 and outputs 230 for an air conditioning system such as the example air conditioning system 100 of FIG. 1. The comfort level in a vehicle cabin 240 has multiple cooling inputs 210, such as air flow, cooling BTUs, and heating BTUs. The comfort level in the vehicle cabin 240 also has multiple heating inputs 220, such as the ambient temperature surrounding the cab, the impact of solar heating on the cab, and radiant heat (e.g., engine heat). The comfort level in the vehicle cabin 240 is also affected by heat loss outputs 230 such as air leaks and heat radiating outward.

Figure 3:
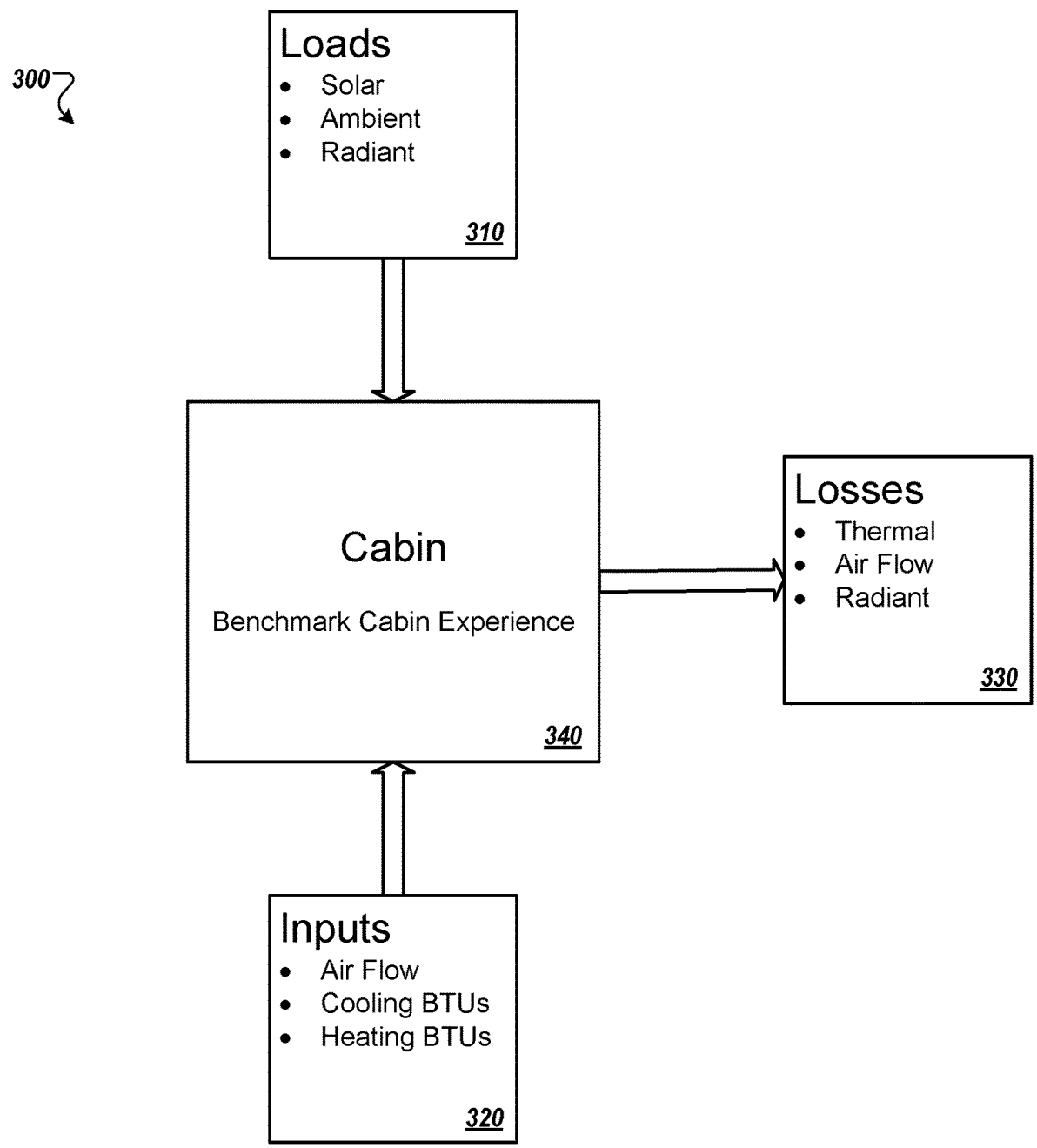
FIG. 3 is a block diagram that shows example inputs and outputs for an environmental experience.

FIG. 3 is a block diagram 300 that shows example inputs and outputs for an environmental experience. A benchmark cabin experience 340 is based on similar thermal inputs and outputs as were discussed in the description of FIG. 2. A collection of thermal loads 310, such as solar energy, radiant heat, and ambient temperatures, can act as inputs to the amount of heat in a cabin. A collection of system inputs 320, such as air flow and BTUs (e.g., including both heating and cooling), can also contribute to the temperature of the cabin. A collection of losses 330, such as thermal (e.g., conductive)

transmissions, outward airflow, and outward radiance of heat, can outwardly affect the temperature of the cabin.

Figure 4:
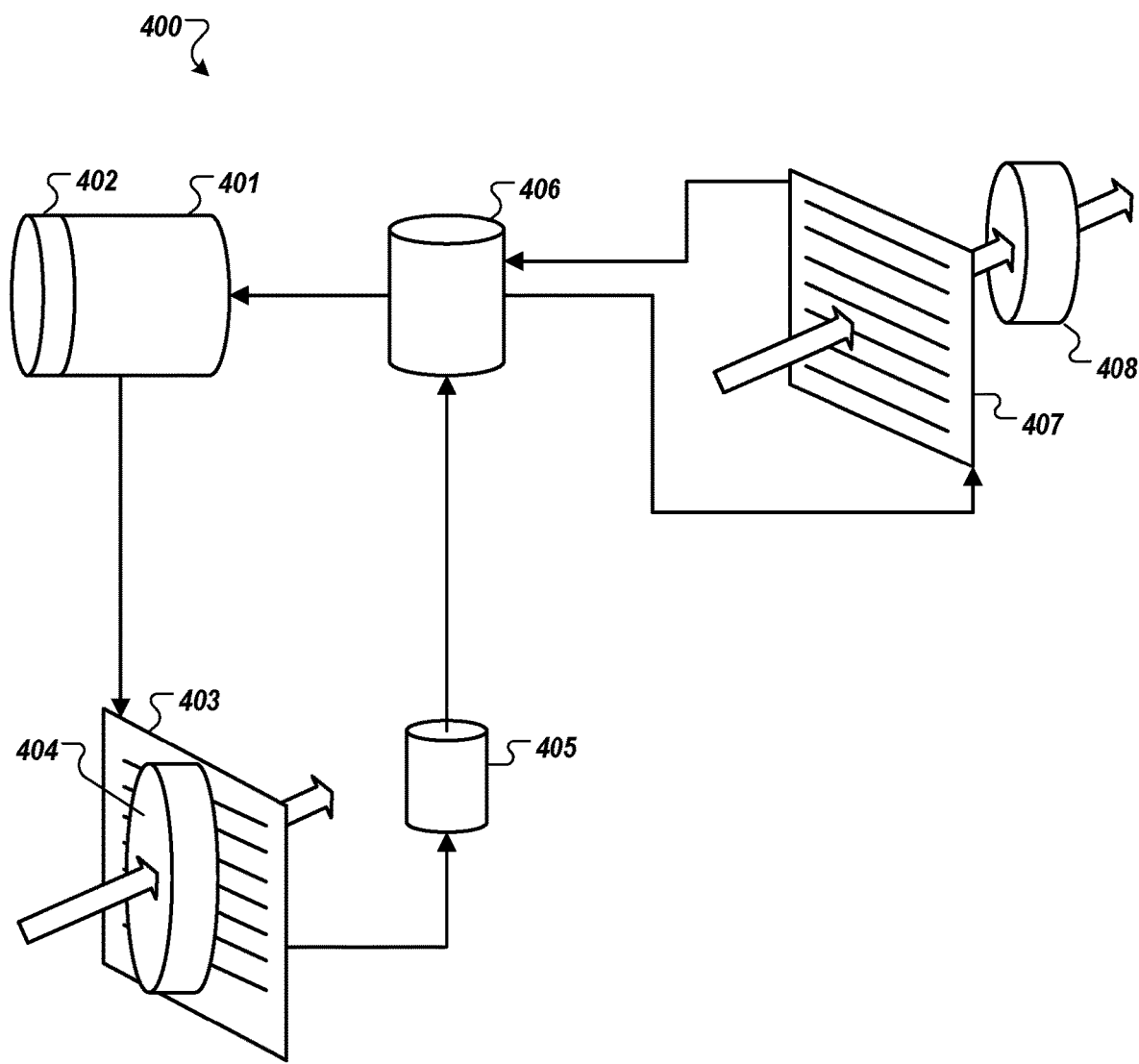
FIG. 4 is a schematic diagram that shows an example air conditioning system for a vehicle.

FIG. 4 is a schematic diagram that shows an example air conditioning system 400 for a vehicle. The system 400 includes a compressor 401, a compressor clutch 402, a condenser 403, a condenser fan 404, a receiver/drier 405, an expansion valve 406, an evaporator 407, and a cabin blower motor 408. In some embodiments, the system 400 can be the system 100 of FIG. 1. In some embodiments, the compressor 401 can be the compressor 120. In some embodiments, the compressor clutch 402, the condenser 403, the condenser fan 404, the receiver/drier 405, the expansion valve 406, the evaporator 407, and/or the cabin blower motor 408 can be housed within the rooftop unit 130.

Hot compressed gas flows at high pressure from the compressor 401 to the condenser 403. The condenser fan 404 blows air over the condenser 403 to cool the gas into a liquid, which then flows at high pressure to the receiver/drier 405 and on to the expansion valve 406. The expansion valve 406 allows the pressurized liquid to depressurize to low pressure, and as the liquid expands, it cools further. The cold pressurized liquid flows at low pressure to the evaporator 407 where the cabin blower motor 408 drives a fan that blows warm air over the evaporator 407. The cold liquid absorbs the heat and vaporizes into a cold vapor at low pressure. This vapor is then returned to the compressor to complete the cycle.

Figure 5B:
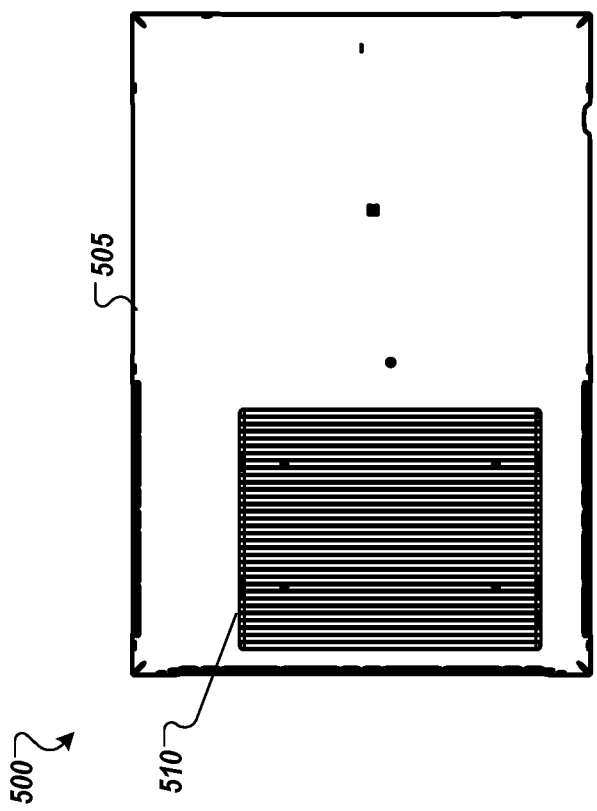
FIGS. 5A-5F show various views of an example rooftop unit.
Figure 5D:
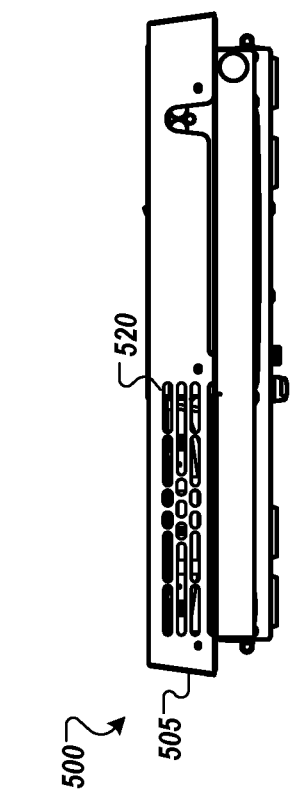
Figure 5A:
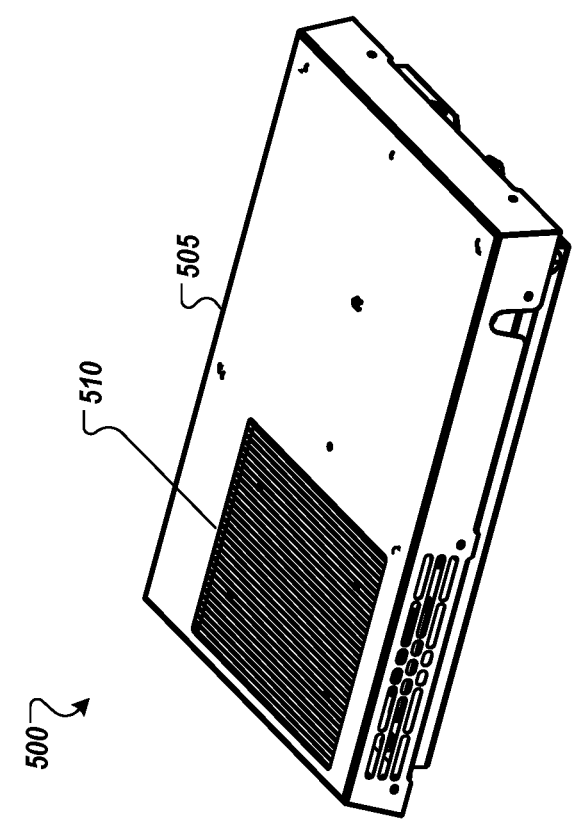
Figure 5C:
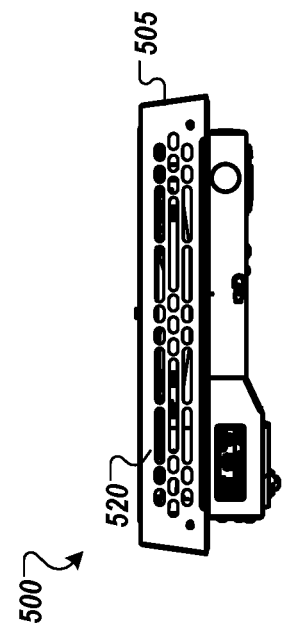

FIGS. 5A-5F show various views of an example rooftop unit 500. FIGS. 5A and 5B show a topside perspective and topside view, respectively, of the rooftop unit 500. Visible in these views is a housing 505 and an exhaust port 510. FIG. 5C shows a side view of the rooftop unit 500 and FIG. 5D shows a front or rear view of the rooftop unit 500. Visible in these views is a housing 505 and a collection of intake ports 520. The rooftop unit 500 has a low profile design.

Figure 5E:
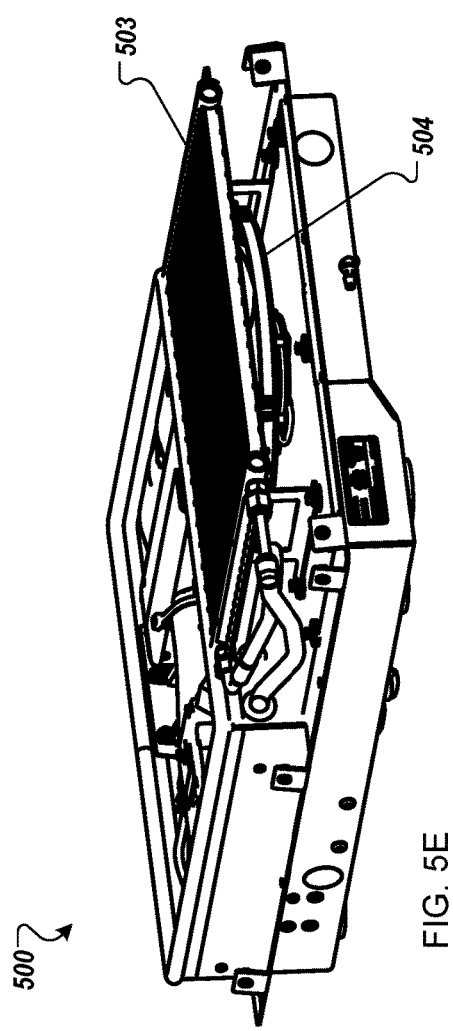
Figure 5F:
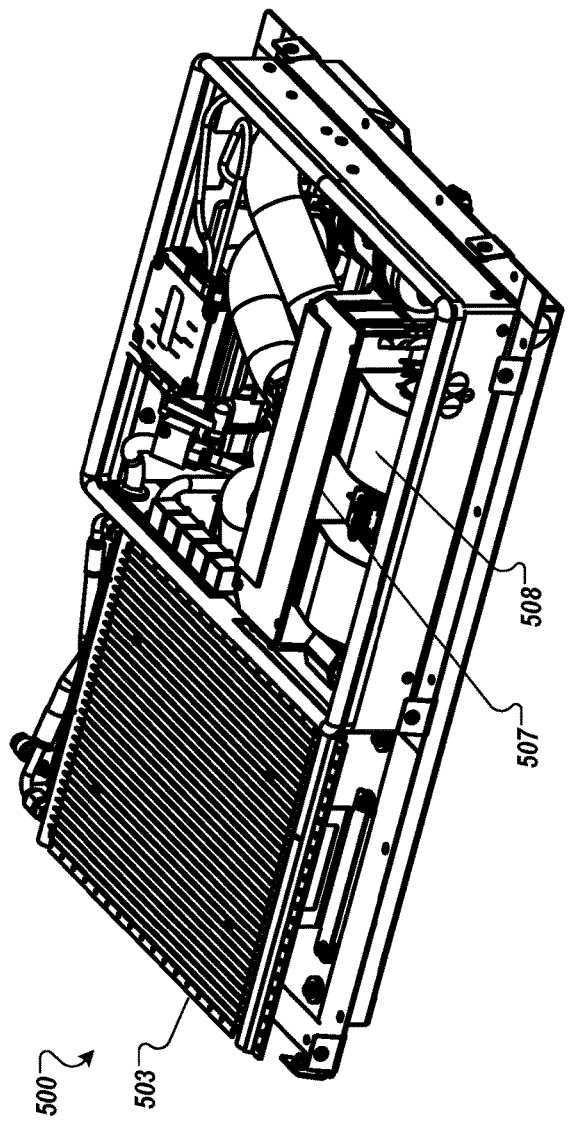

FIGS. 5E and 5F are topside perspective views of the rooftop unit 500 with the housing 505 removed. In these views, a condenser 503, a condenser fan 504, an evaporator 507, and a blower fan assembly 508 are visible.

In some embodiments, the configuration of the condenser flow control design can allow the condenser 503 to be placed in a semi-reclined state providing reduced height. In the illustrated example, the condenser fan 504 is arranged below the condenser 503 and is configured to blow upwards though the core of the condenser 503.

In some embodiments, the rooftop unit 500 can be the rooftop unit 130 of FIG. 1. In some embodiments, the rooftop unit 500 can be mounted on the roof of a vehicle cab or enclosure. In some embodiments, the rooftop unit 500 can be mounted on a side wall of a vehicle cab or enclosure. In some embodiments, the rooftop unit 500 can be mounted remotely from a vehicle cab or enclosure (e.g., connected by air ducts).

FIGS. 6A and 6B shows a bottom perspective and bottom views (e.g., cabin interior side) of the rooftop unit 500. The underside includes an intake vent 512, a collection of outlet vents 513, and a collection of operator controls 514. In some embodiments, the outlet vents 513 can include the cabin blower motor 408 and fan. Warm cabin air is taken in through the intake vent 512, passed over the evaporator 507, and is returned as cool air by the outlet vents 513. In some embodiments, the flow can be reversed, with air entering in through the fan, passing over the evaporator, and returning as cold air through the vents.

Figure 7A:
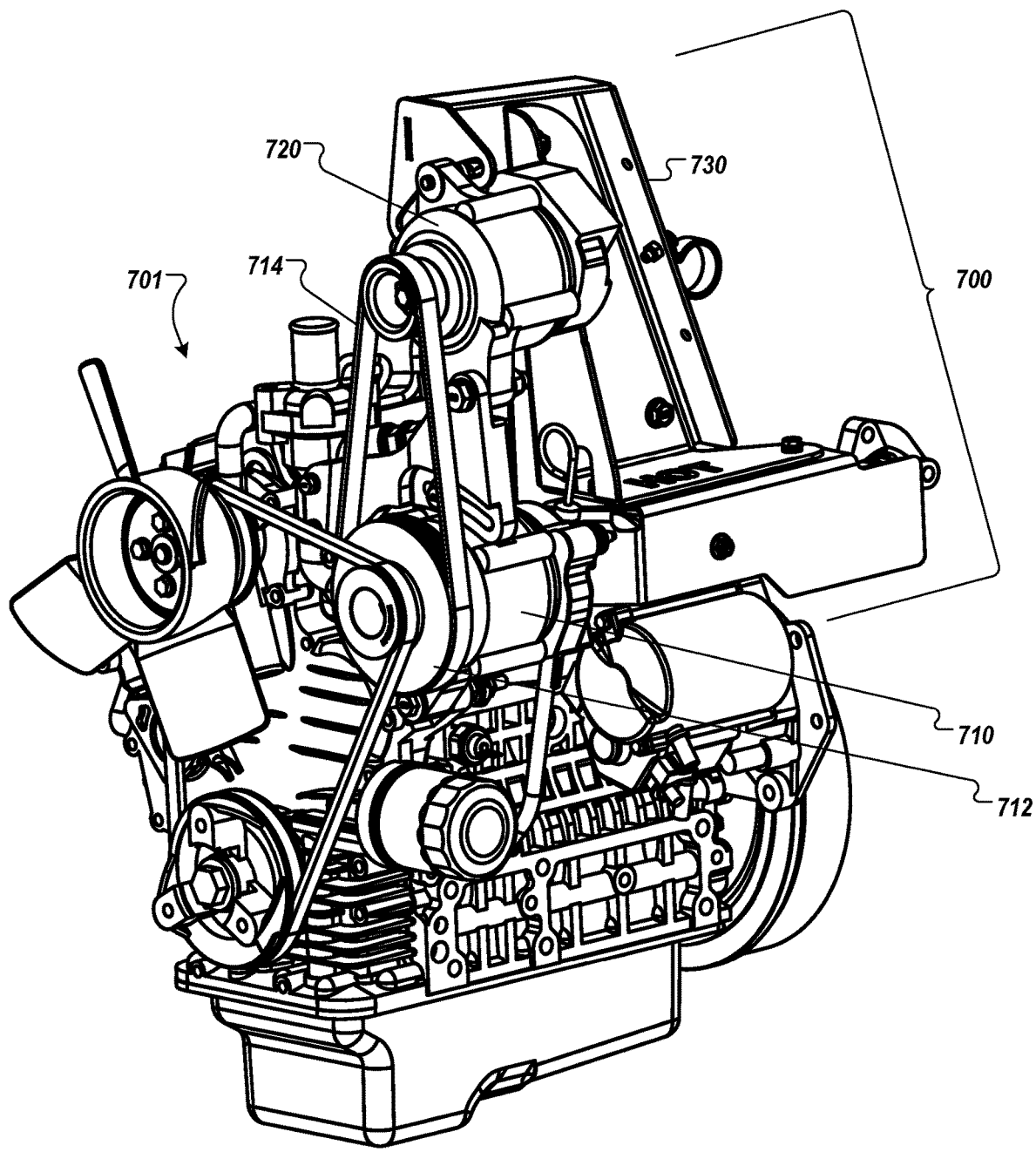
FIGS. 7A and 7B show an example dual drive alternator.
Figure 7B:
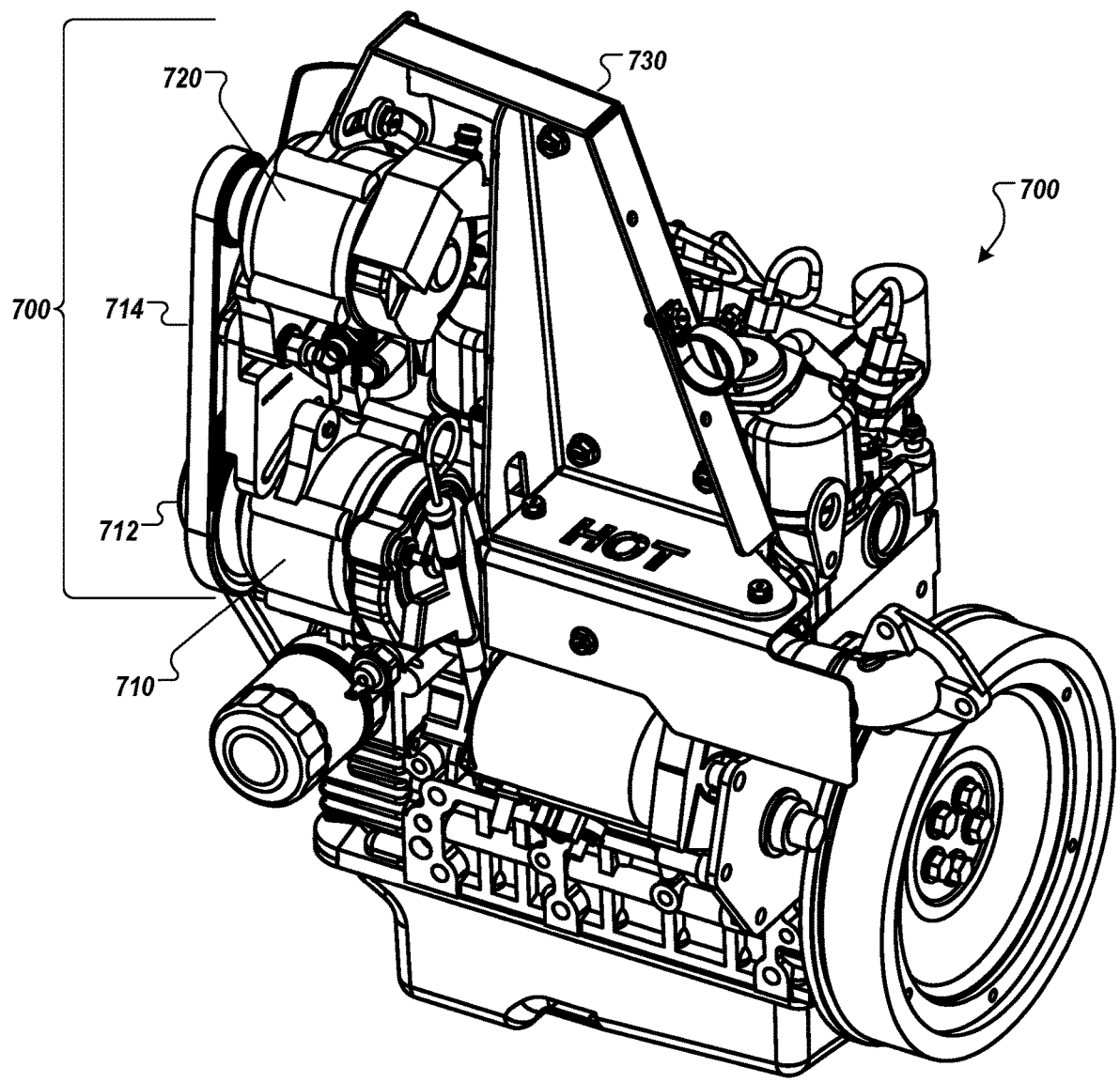

FIGS. 7A and 7B shows an example dual drive alternator system 700 mounted to a vehicle engine 701. The dual drive alternator system 700 is an example of a power system that can be used to power the air conditioner system 100 of FIG. 1. In some embodiments, the dual drive alternator system 700 can be the dual drive alternator 110 of FIG. 1.

The dual drive alternator system 700 includes an alternator 710 and an alternator 720. A mounting bracket 730 provides support for the alternator 720 and maintains the position of the alternator 720 relative to the alternator 710 and the vehicle engine 701. The alternator 710 is configured to power the vehicle's OEM power systems and other accessories (e.g., 12 v output), while the alternator 720 is configured to power at least some parts of an air conditioner system (e.g., additional or higher voltages and/or currents to power an electric condenser motor). In some embodiments, the alternator 710 can be the stock (e.g., OEM) alternator. In some embodiments, the alternator 720 can provide different levels of electrical current and/or voltages than the alternator 710 (e.g., 24 v, 36 v, 48 v). In some embodiments, the electrical output of the alternator 720 can be electrically isolated from the electrical output of the alternator 710.

The dual drive alternator system 700 is driven as a single unit. The alternator 710 is configured with a dual pulley 712 (e.g., an OEM alternator pulley can be replaced by the dual pulley 712). The dual pulley 712 is configured to be driven by the engine's stock serpentine belt and provide a substantially stock drive function for the alternator 710. The dual pulley 712 also provides a drive function for a secondary belt 714 that drives the alternator 720. In the illustrated example, the dual pulley 712 also provides a gear ratio (e.g., the pulley driven by the serpentine belt is smaller than the pulley that drives the secondary belt 714).

In some embodiments, the alternator 720 can be driven at a different speed (e.g., faster) than the alternator 710 (e.g., 30% faster or more). For example, the alternator 710 may be driven at a stock speed (e.g., about 3× the engine RPMs) while the alternator 720 can be driven faster (e.g., 5×-10× the engine RPMs or faster) or slower than the alternator 710.

In some embodiments, the dual drive alternator 700 can be a unitary alternator with two electrical outputs. For example, a stock (e.g., OEM) single-output alternator can be replaced by a unitary, dual-output alternator (e.g., an aftermarket alternator that replaces the OEM alternator while also providing a secondary power output for the air condoning system).

Figure 8:
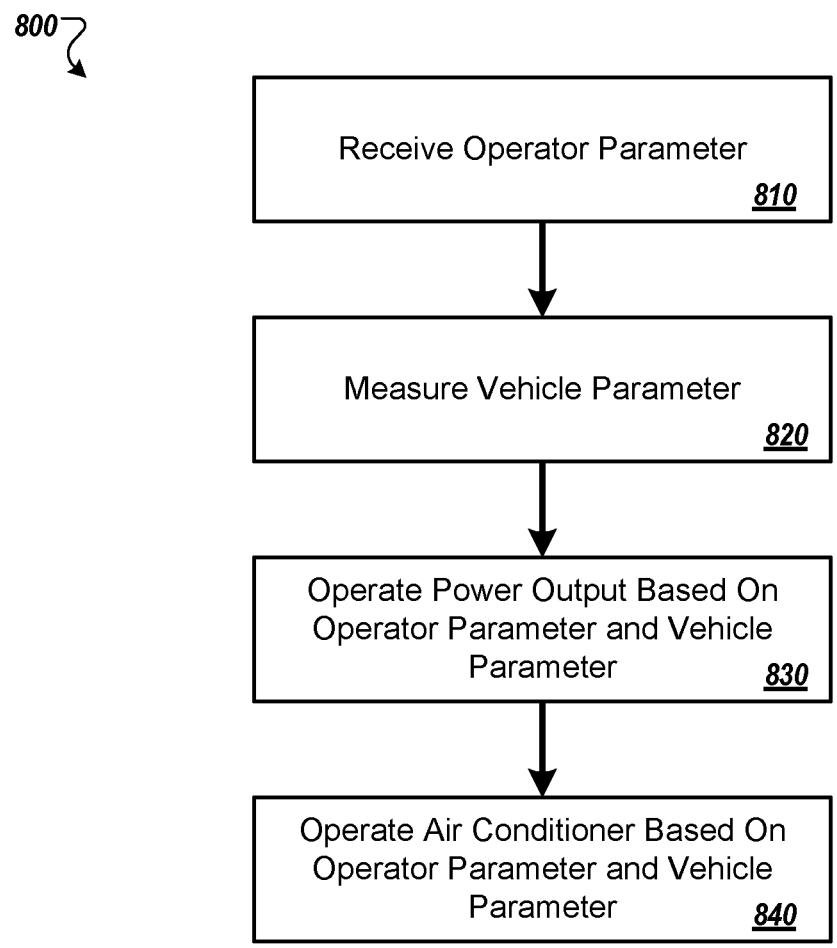
FIG. 8 is a flow diagram of an example process for controlling an air conditioning system.

FIG. 8 is a flow diagram of an example process 800 for controlling a climate control system. In some implementations, the process 800 can be performed by the example controller 140 of FIG. 1.

At 810, an operator parameter is received from an operator. For example, the operator 105 can provide an operator parameter by interacting with the operator controls 514 of FIGS. 6A-6B. The operator parameter can be, for example, one or more of a climate control on/off setting, a temperature setting, a vehicle performance setting, and/or combinations of these and any other appropriate climate control or vehicle performance setting.

In some implementations, the operator parameter includes one or more of an operator-provided parameter having one or more of a heating mode parameter, a cooling mode parameter, a blower mode parameter, or a vehicle performance parameter. For example, the operator 105 may select a balance between cabin comfort at the expense of vehicle acceleration or top speed, and vehicle performance at the expense of precise or rapid cabin temperature control.

At 820, a vehicle parameter of a vehicle is measured. In some implementations, the vehicle parameter can include one or more of an engine operational parameter, an electrical system parameter, or an environmental parameter measured or monitored by the controller 104.

In some implementations, the engine operational parameter can include one or more of a measured engine speed value (e.g., RPMs), a measured vehicle speed value (e.g., MPH, KPH), a measured engine torque value, a measured manifold pressure value, a measured throttle position value, and/or combinations of these and other appropriate parameters that can describe an operational condition of a vehicle.

In some implementations, the electrical system parameter can include one or more of a power switch setting, a measured battery current value, a measured battery voltage value, a battery voltage threshold value, and/or combinations of these and any other appropriate parameter that can describe an electrical condition.

In some implementations, the environmental parameter can include one or more of a timer parameter, a measured vehicle cabin air temperature value, a measured ambient air temperature value, a measured evaporator core temperature value, and/or combinations of these and any other appropriate parameter that can describe an environment.

At 830, a first power output of a power delivery system configured to be driven by a motor of a vehicle is operated based on the operator parameter and the vehicle parameter. For example, power from the example alternator 720 of FIGS. 7A-7B can be turned on or off to the compressor based on a user-provided vehicle performance setting and a determination that the engine RPMs have been above a predetermined minimum value for longer than a predetermined amount of time (e.g., power is provided when the vehicle appears to be a cruising speed, such that additional engine power is available for powering the air conditioner without substantially affecting the vehicle's current performance state).

At 840, an air conditioner, powered by the first power output, is operated based on an operator parameter and the vehicle parameter. In some implementations, operating the air conditioner can include controlling one or more of the first blower, the second blower, and the compressor. For example, the compressor 120 and/or blower motors in the rooftop unit 130 can be turned on or off based on the user-provided vehicle performance setting, and a determination that cabin temperature is outside of a predetermined target setting (e.g., the air conditioning unit engages when the vehicle appears to be a cruising speed and when the cabin is above a selected temperature, such that additional engine power is available for powering the air conditioner without substantially affecting the vehicle's current performance state).

In some embodiments, the air conditioner includes a compressor configured to compress a refrigerant, an evaporator configured to expand the refrigerant, a first blower configured to direct air across the evaporator, and a second blower configured to direct air across a heat exchanger. For example, the air conditioner can be the example air conditioning system 400 of FIG. 4.

In some implementations, operating the first electrical power output of the power delivery system includes selectively providing a clutch control signal, wherein the power delivery system is a mechanical power delivery system configured to be driven by a motor of a vehicle, and the first power output is configured to mechanically drive a compressor of the air conditioner through a clutch that is configured to selectively engage based on the clutch control signal. For example, the example compressor 401 may be rotationally coupled to the output of the example vehicle engine 101 though the clutch 402. The controller 140 may control the clutch 402 to selectively engage and disengage the load presented by the compressor 401 from the vehicle engine 101 (e.g., to free up available rotational power from the vehicle engine 101 for other tasks such as accelerating the vehicle).

In some implementations, operating the first electrical power output of the power delivery system can include selectively providing a first field current, wherein the power delivery system is an alternator system having a first alternator configured to be driven by a motor of a vehicle, wherein the first power output is a first electrical output of the first alternator, the first electrical output configured to power, based on the first field current, to an electric motor configured to drive a compressor of the air conditioner. For example, a typical automotive alternator can require a field current through its rotor in order to develop the magnetic field needed to excite an electrical output current in its stator. The controller 140 can selectively turn the field current to the second output section 114 on and off, for example, to selectively engage and disengage the electrical load of the compressor 120 from the dual drive alternator 110 and the vehicle engine 101.

In some implementations, the alternator system can include the first alternator and a second alternator configured to provide the second power output as a second electrical output based on a second field current. For example, the example dual drive alternator system 700 includes the alternator 710 that can power the vehicle's OEM systems, and the alternator 720 that can power the example air conditioner 400. In some implementations, the first alternator can be configured to spin at least 30% faster than the second alternator. For example, the alternator 710 can spin at OEM speeds while the alternator 720 can spin at faster-than-OEM speeds.

Figure 9:
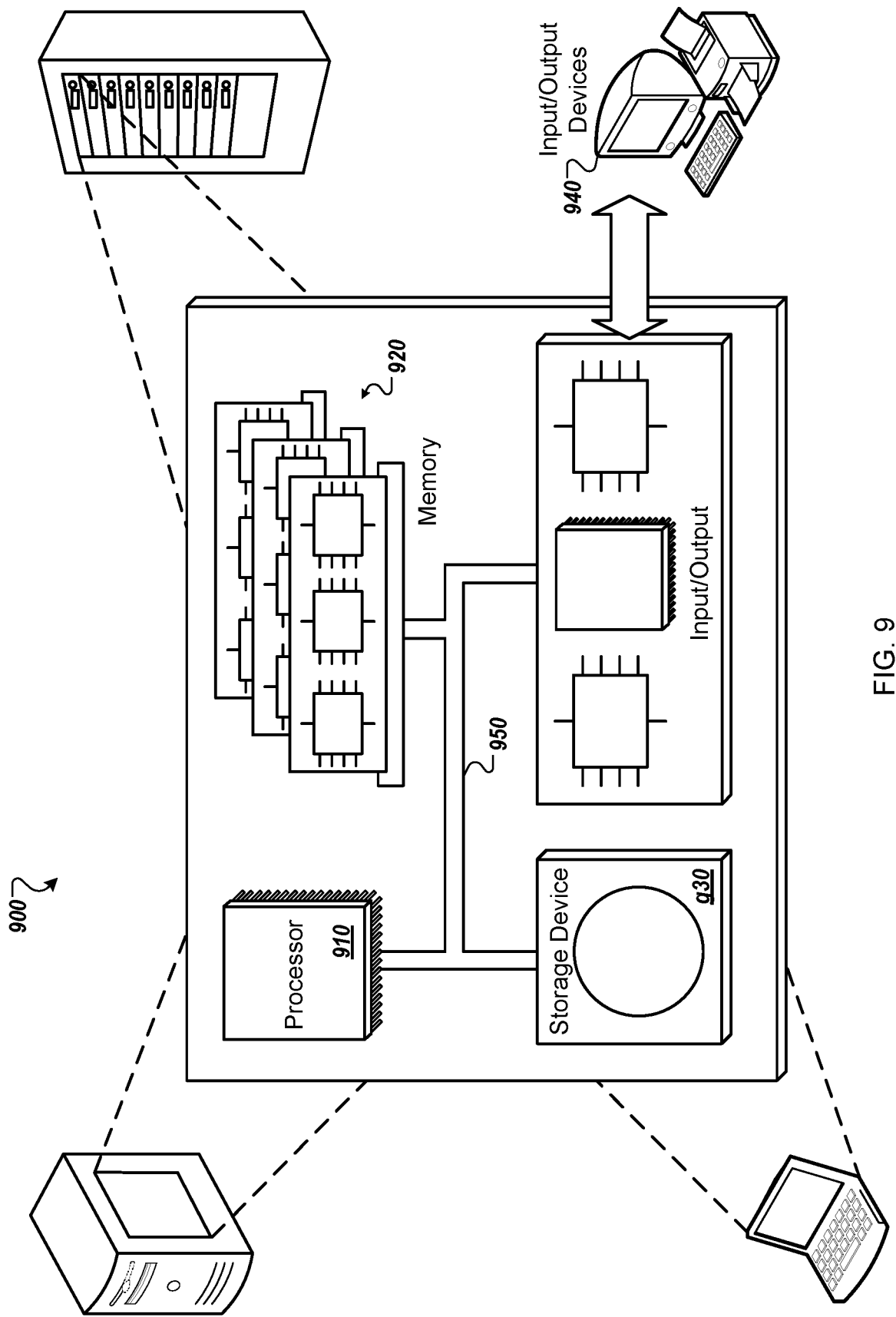
FIG. 9 shows an example computer system.

FIG. 9 is a schematic diagram of an example of a generic computer system 900. The system 900 can be used for the operations described in association with various method according to some implementations. For example, the system 900 may be included in the load controller 140 of FIG. 1.

The system 900 includes a processor 910, a memory 920, a storage device 930, and one or more input/output devices 940. Each of the components 910, 920, 930, and 940 are interconnected using a system bus 950. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930 to display graphical information for a user interface on the input/output device 940.

The memory 920 stores information within the system 900. In one implementation, the memory 920 is a computer-readable medium. In one implementation, the memory 920 is a volatile memory unit. In another implementation, the memory 920 is a non-volatile memory unit.

The storage device 930 is capable of providing mass storage for the system 900. In one implementation, the storage device 930 is a computer-readable medium. In various different implementations, the storage device 930 may be a floppy disk device, a hard disk device, an optical disk device, or a tape device.

The input/output device 940 provides input/output operations for the system 900. In one implementation, the input/output device 940 includes a keyboard and/or pointing device. In another implementation, the input/output device 940 includes a display unit for displaying graphical user interfaces. In another implementation, the input/output device can receive inputs from one or more sensors configured to monitor various parameters of the vehicle, the air conditioning system, the alternator(s), and/or the engine.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A climate control system comprising:
an electrical power delivery system configured to be driven by a motor of a vehicle and having a first alternator having a first electrical power output that selectively provides electrical power to an electric motor based on a first alternator field current, and a second alternator configured to provide a second electrical power output that provides electrical power to the vehicle based on a second alternator field current;
an air conditioner configured to be at least partly powered by the first electrical power output and comprising:
a compressor, driven by the electric motor based on the first electrical power output, to compress a refrigerant;
an evaporator configured to expand the refrigerant;
a first blower configured to direct air across the evaporator; and
a second blower configured to direct air across a heat exchanger; and
a load management controller configured to operate the air conditioner and the first alternator field current based on an operator parameter and one or more vehicle parameters.

2. The climate control system of claim 1, wherein the operator parameter comprises an operator-provided parameter comprising one or more of; a heating mode parameter, a cooling mode parameter, a blower mode parameter, or a vehicle performance parameter.

3. The climate control system of claim 1, wherein the one or more vehicle parameters comprise one or more of: an engine operational parameter, an electrical system parameter, or an environmental parameter.

4. The climate control system of claim 3, wherein the engine operational parameter comprises one or more of: a measured engine speed value, a measured engine torque value, a measured manifold pressure value, a measured vehicle speed value, or a measured throttle position value.

5. The climate control system of claim 3, wherein the environmental parameter comprises one or more of; a timer parameter, a measured vehicle cabin air temperature value, a measured ambient air temperature value, or a measured evaporator core temperature value.

6. The climate control system of claim 1, wherein the one or more vehicle parameters comprise an electrical system parameter that comprises one or more of; a power switch setting, a measured battery current value, or a measured battery voltage value.

7. The climate control system of claim 1, wherein the first alternator is configured to spin at a different speed than the second alternator.

8. The climate control system of claim 1, wherein the load management controller is configured to operate the air conditioner by controlling one or more of the first blower, the second blower, or the compressor.

9. A method of controlling a climate control system, the method comprising:
 receiving, from an operator, an operator parameter;
 measuring a vehicle parameter of a vehicle having an engine;
 driving, by the engine, a first alternator and a second alternator;
 selectively providing, based on the operator parameter and the vehicle parameter, a first alternator field current to the first alternator based on the operator parameter and the vehicle parameter;
 providing a second alternator field current to the second alternator;
 selectively providing, by the first alternator and based on the first alternator field current, a first electrical output;
 selectively powering, based on the first electrical output, an electric motor configured to drive a compressor of an air conditioner;
 selectively operating the air conditioner, based on the operator parameter and the vehicle parameter; and
 providing, by the second alternator, a second electrical output to the vehicle.

10. The method of claim 9, wherein the air conditioner comprises:
 an evaporator configured to expand a refrigerant, wherein the compressor is configured to compress the refrigerant;
 a first blower configured to direct air across the evaporator; and
 a second blower configured to direct air across a heat exchanger.

11. The method of claim 10, wherein operating the air conditioner comprises controlling one or more of the first blower, the second blower, or the compressor.

12. The method of claim 9, wherein the operator parameter comprises one or more of an operator-provided parameter comprising one or more of a heating mode parameter, a cooling mode parameter, a blower mode parameter, or a vehicle performance parameter.

13. The method of claim 9, wherein the vehicle parameter comprises one or more of an engine operational parameter, an electrical system parameter, or an environmental parameter.

14. The method of claim 13, wherein the engine operational parameter comprises one or more of a measured engine speed value, a measured vehicle speed value, a measured engine torque value, a measured manifold pressure value, or a measured throttle position value.

15. The method of claim 13, wherein the environmental parameter comprises one or more of a timer parameter, a measure vehicle cabin air temperature value, a measured ambient air temperature value, or a measured evaporator core temperature value.

16. The method of claim 9, wherein the vehicle parameter comprises an electrical system parameter that comprises one or more of a power switch setting, a measured battery current value, a measured battery voltage value, or a battery voltage threshold value.

17. The method of claim 9, wherein the first alternator is configured to spin at a different speed than the second alternator.

18. A non-transitory computer storage medium encoded with a computer program, the program comprising instructions that when executed by data processing apparatus cause the data processing apparatus to perform operations comprising:
 receiving, from an operator, an operator parameter;
 measuring a vehicle parameter of a vehicle having an engine;
 driving, by the engine, a first alternator and a second alternator;
 selectively providing, based on the operator parameter and the vehicle parameter, a first alternator field current to the first alternator based on the operator parameter and the vehicle parameter;
 providing a second alternator field current to the second alternator;
 selectively providing, by the first alternator and based on the first alternator field current, a first electrical output;
 selectively powering, based on the first electrical output, an electric motor configured to drive a compressor of an air conditioner;
 selectively operating the air conditioner based on the operator parameter and the vehicle parameter; and
 providing, by the second alternator, a second electrical output to the vehicle.

* * * * *

UNITED STATES PATENT AND TRADEMARK OFFICE
CERTIFICATE OF CORRECTION

Page 1 of 1

PATENT NO. : 10,471,806 B2
APPLICATION NO. : 15/698105
DATED : November 12, 2019
INVENTOR(S) : Deven Hurst and Gabor Hajos It is certified that error appears in the above-identified patent and that said Letters Patent is hereby corrected as shown below:

In the Drawings

Sheet 11 of 11 (FIG. 9), delete "g30" and insert -- 930 --.

Signed and Sealed this
Thirty-first Day of March, 2020

Andrei Iancu
*Director of the United States Patent and Trademark Office*